US012438265B2

(12) United States Patent
Wu et al.

(10) Patent No.: US 12,438,265 B2
(45) Date of Patent: Oct. 7, 2025

(54) ANTENNA AND VEHICLE EMPLOYING ANTENNA

(71) Applicants: Futaijing Precision Electronics (Yantai) Co., Ltd., Yantai (CN); HON HAI PRECISION INDUSTRY CO., LTD., New Taipei (TW)

(72) Inventors: Ching-Ling Wu, New Taipei (TW); Hsiang-Neng Wen, New Taipei (TW); Yung-Yu Tai, New Taipei (TW); Chih-Wei Liao, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 149 days.

(21) Appl. No.: 18/378,105

(22) Filed: Oct. 9, 2023

(65) Prior Publication Data

US 2025/0062525 A1 Feb. 20, 2025

(30) Foreign Application Priority Data

Aug. 17, 2023 (CN) ......................... 202322219311.4

(51) Int. Cl.
*H01Q 1/32* (2006.01)
*H01Q 1/36* (2006.01)
*H01Q 1/48* (2006.01)
*H01Q 21/30* (2006.01)

(52) U.S. Cl.
CPC ................. *H01Q 1/48* (2013.01); *H01Q 1/32* (2013.01); *H01Q 1/36* (2013.01)

(58) Field of Classification Search
CPC ............ H01Q 1/24; H01Q 1/243; H01Q 1/32; H01Q 1/3208; H01Q 1/3275; H01Q 1/36; H01Q 1/48; H01Q 5/328; H01Q 21/28; H01Q 5/371
See application file for complete search history.

(56) References Cited

U.S. PATENT DOCUMENTS

| | | | | |
|---|---|---|---|---|
| 5,146,232 | A * | 9/1992 | Nishikawa | H01Q 9/40 343/829 |
| 11,152,691 | B2 * | 10/2021 | Filatov | H01Q 1/36 |
| 2006/0187123 | A1 * | 8/2006 | Ando | H01Q 9/0407 343/700 MS |
| 2016/0141767 | A1 * | 5/2016 | Zhai | H01Q 1/38 343/893 |
| 2022/0021116 | A1 * | 1/2022 | Wen | H01Q 1/48 |

* cited by examiner

*Primary Examiner* — Thai Pham
(74) *Attorney, Agent, or Firm* — ScienBiziP, P.C.

(57) ABSTRACT

An antenna comprises a first radiation part, a second radiation part, a feed part, and a ground part. The first radiation part comprises a first radiator. The second radiation part comprises a second radiator. A first side of the feed part bends upward to form the first radiator, which is a part of the first radiation part. A second side of the feed part bends upward to form the second radiator, which is a part of the second radiation part. The first side is arranged relative to the second side. A height difference between the first radiator and the second radiator in the first direction is within a preset range. The first direction is perpendicular to a plane where the feed part is located. A vehicle is also provided.

20 Claims, 7 Drawing Sheets

ANTENNA AND VEHICLE EMPLOYING ANTENNA

TECHNICAL FIELD

The subject matter herein generally relates to antenna structure.

BACKGROUND

In a car networking system, vehicle systems need to rely on a wireless fidelity (WIFI) network to achieve wireless data transmission. The WIFI network has advantages of convenience, high transmission speed, mobility, and so on. However, a traditional antenna of the car networking system has poor transmission, small antenna broadband, and large volume. The traditional antenna generally covers a frequency band of 5.15 GHz~5.85 GHz or even smaller, and the signal omnidirectional is not uniform, which cannot complete omnidirectional coverage of the use area.

BRIEF DESCRIPTION OF THE DRAWINGS

Implementations of the present technology will now be described, by way of example only, with reference to the attached figures.

DETAILED DESCRIPTION

Figure 1:
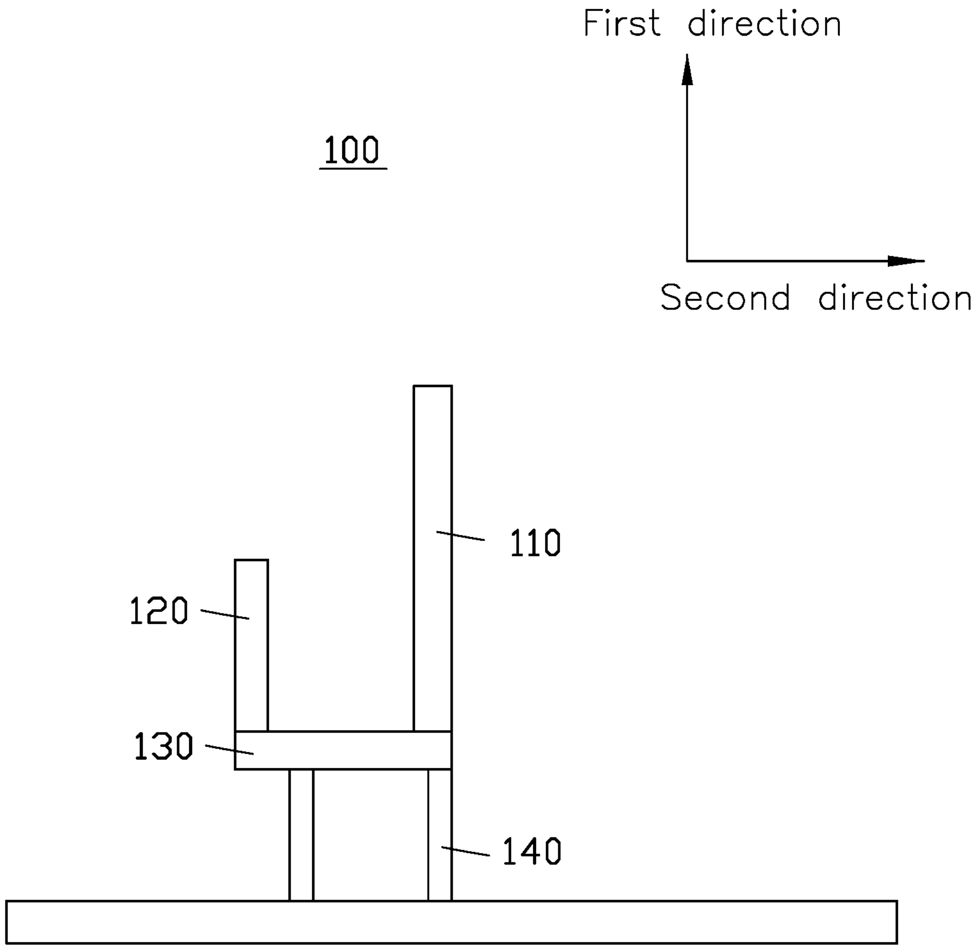
FIG. 1 is a diagram illustrating an antenna according to an embodiment of the present application.

It will be appreciated that for simplicity and clarity of illustration, where appropriate, reference numerals have been repeated among the different figures to indicate corresponding or analogous elements. In addition, numerous specific details are set fourth in order to provide a thorough understanding of the embodiments described herein. However, it will be understood by those of ordinary skill in the art that the embodiments described herein can be practiced without these specific details.

In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 7:
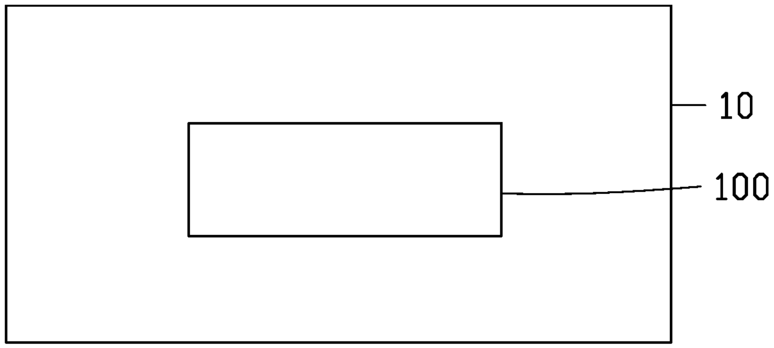
FIG. 7 is a diagram illustrating a vehicle according to an embodiment of the present application.

FIG. 1 is a diagram of one embodiment of an antenna 100 according to the present application. The antenna 100 can be set in a Customer Premise Equipment (CPE), a router, a Set Top Box (STB), a vehicle 10 (as shown in FIG. 7), etc. The antenna 100 is configured to transmit and receive radio waves, to transmit and exchange radio signals.

The antenna 100 comprises a first radiation part 110, a second radiation part 120, a feed part 130, and a ground part 140. The first radiation part 110 comprises a first radiator 111. The second radiation part 120 comprises a second radiator 121. The first radiator 111 connects to a first side of the feed part 130 and protrudes upwardly from the first side. The second radiator 121 connects to a second side of the feed part 130 and protrudes upward from the second side. The first side is arranged relative to the second side. A height difference between the first radiator 111 and the second radiator 121 in the first direction is within a preset range. The first direction is perpendicular to a plane where the feed part 130 is located. The ground part 140 is arranged vertically on a side of the first radiator 111. A preset interval is existed between the ground part 140 and the feed part 130 in a second direction. The second direction is perpendicular to the first direction. The ground part 140 comprises an open slot 141. Among them, the first radiation part 110, the second radiation part 120, the feed part 130, and the ground part 140 can be integrated in one body.

In one embodiment, the feed part 130 can be electrically connected to a circuit board by conducting components (such as wires, microstrip wires, etc.), and the ground part 140 can be electrically connected to the same or different circuit board by welding, etc. The first radiator 111, the second radiator 121, the feed part 130, and the ground part 140 can be wafer bodies. The incoming signal (for example, the incoming current signal) input from the feed part 130 passes through the first radiator 111, then flows to the ground through the ground part 140 to stimulate the first radiator 111 to produce a changing magnetic field, and generate the radiation signal of a first working band. The feed signal input from the feed part 130 also passes through the second radiator 121, and then flows to the ground through the ground part 140 to stimulate the second radiator 121 to produce a changing magnetic field, and generate the radiation signal of a second working band. Among them, the first working band can comprise 2.4~2.5 GHz. The second working band can comprise 5.15~5.85 GHz, 6.1~6.8 GHz, 7.1~7.25 GHz. The first radiator 111 can be arranged at an angle of 70°, 90°, 120°, etc. with the feed part 130. The second radiator 121 can be arranged at an angle of 70°, 90°, 120°, etc. with the feed part 130. The first radiator 111 and the second radiator 121 can be formed from tinplate nickel plating. The antenna 100 of the present embodiment can be made of a metal sheet or be made by Laser Direct Structuring (LDS), and attached to a plastic housing of a wireless communication device by glue.

Furthermore, by setting the height difference between the first radiator 111 and the second radiator 121 in the first direction within a preset range, for example, setting the first radiator 111 higher than the second radiator 121, can reduce the radiation interference between the part of the first radiator 111 higher than the second radiator 121 and the second radiator 121, and improve the radiation efficiency. Alternatively, the second radiator 121 is higher than the first radiator 111, and the radiation interference between the part of the second radiator 121 higher than the first radiator 111 and the first radiator 111 is reduced to improve the radiation efficiency. The preset range can be set according to an actual application. For example, for the antenna 100 with a small size, the preset range can be set to a smaller value range, and for the antenna 100 with a large size, the preset range can be set to a larger value range. The first direction can be set perpendicular to the ground or perpendicular to the feed part 130.

The input impedance matching of antenna 100 can be adjusted by adjusting the preset interval D between the feed part 130 and the ground part 140.

By setting the height difference between the first radiator 111 and the second radiator 121 in the first direction within the preset range, the radiation interference between the first radiator 111 and the second radiator 121 can be reduced, thus improving the radiation efficiency of the antenna 100.

In one embodiment, the first radiator 111 is arranged at an angle of 90° with the feed part 130, to reduce the radiation interference of the feed part 130 and the circuit plate to the first radiator 111. Furthermore, the second radiator 121 can be arranged at an angle of 90° or greater than 90° with the feed part 130, which can reduce the radiation interference of the second radiator 121 to the first radiator 111.

Figure 2:
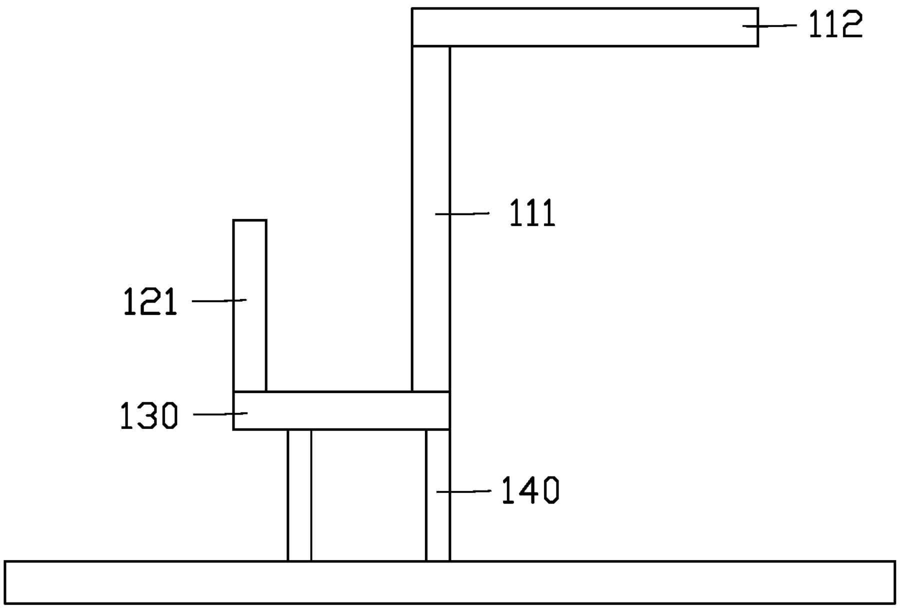
FIG. 2 is a diagram illustrating an antenna according to another embodiment of the present application.

FIG. 2 is a diagram of another embodiment of the antenna 100 according to the present application.

The first radiation part 110 further comprises a third radiator 112. The first radiator 111 bends and extends in a direction away from the feed part 130 to form the third radiator 112.

In one embodiment, a shape of the third radiator 112 can be a rectangle. The third radiator 112 can increase the radiation area and decrease the height of the antenna 100. For example, if the first radiator 111 is higher than the second radiator 121 with 2 cm, the third radiator 112 can bend from a place where the first radiator 111 is higher than the second radiator 121 with 1 cm. In this way, the height of the antenna 100 can be reduced by up to 1 cm. Among them, the area of the third radiator 112 can be set according to the actual application, for example, set to not exceed the area of the circuit plate. In this way, the radiation area can be increased slightly without additional occupation area. Furthermore, the third radiator 112 can be set at an angle of 80°, 90°, or 120° with the first radiator 111.

Figure 3:
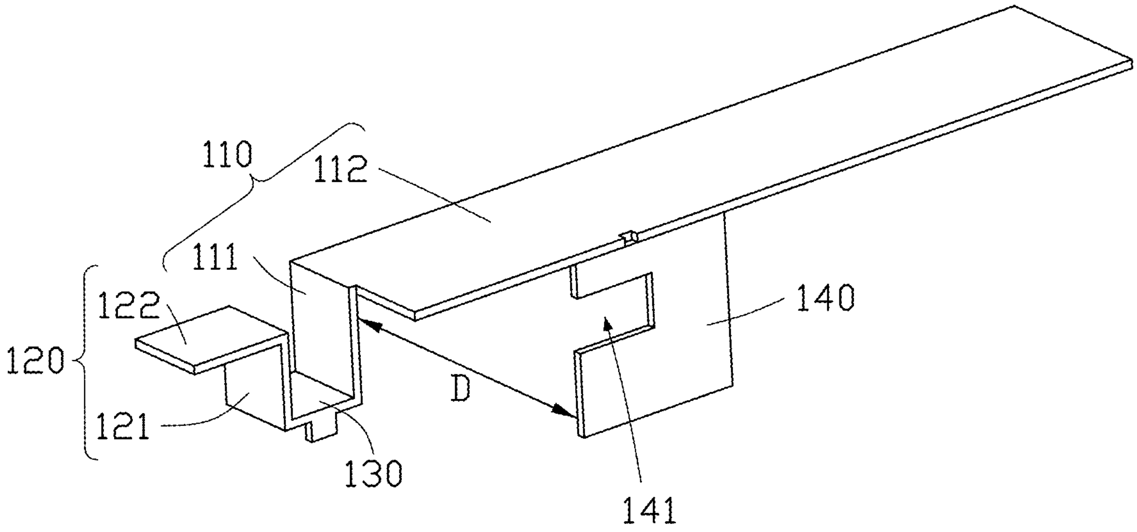
FIG. 3 is a diagram illustrating the antenna according to another embodiment of the present application.
Figure 4:
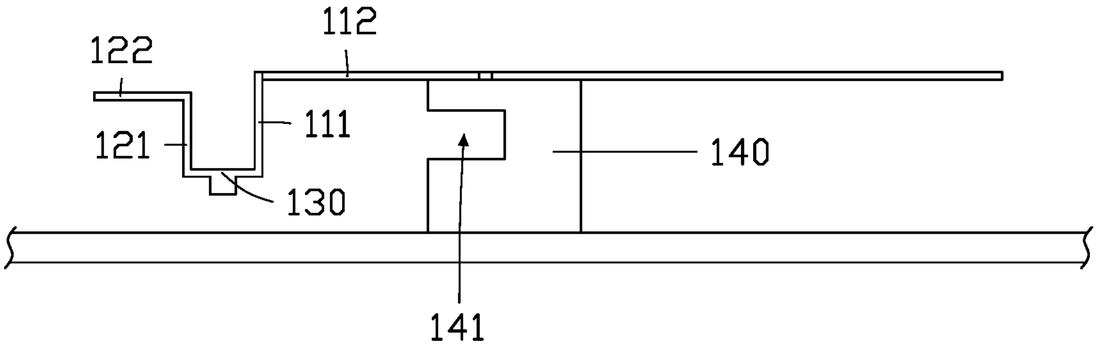
FIG. 4 is a side view diagram illustrating the antenna in FIG. 3.

As shown in FIG. 3 and FIG. 4, the second radiation part 120 further comprises a fourth radiator 122. The second radiator 121 bends and extends in a direction away from the feed part 130 to form the fourth radiator 122.

In one embodiment, a shape of the fourth radiator 122 can be a rectangle. The fourth radiator 122 can increase the radiation area while decreasing the height of the antenna 100. For example, if the second radiator 121 is higher than the second radiator 121 with 2 cm, the fourth radiator 122 can bend from a place where the second radiator 121 is higher than the second radiator 121 with 1 cm. In this way, the height of the antenna 100 can be reduced by up to 1 cm. Among them, the area of the fourth radiator 122 can be set according to the practical application, for example, set to not exceed the area of the circuit plate. In this way, the radiation area can be increased slightly without additional occupation area. Furthermore, the fourth radiator 122 can be set at an angle of 80°, 90°, or 120° with the second radiator 121.

In one embodiment, by arranging the third radiator 112 in a rectangle, the first radiator 111 can be arranged on a width side of the rectangle. The ground part 140 is arranged close to the feed part 130 and on a one-third length of a length side of the rectangle. In this way, the underground path of antenna 100 can be increased, and the current distribution inside the third radiator 112 can be changed, so that the magnetic field generated by the third radiator 112 can be changed, thus increasing the bandwidth of antenna 100.

In one embodiment, the open slot 141 is arranged on a side of the ground part close to the feed part. In this way, the current distribution in the ground part 140 can be changed, which is conducive to improving the radiation performance of the antenna 100.

Figure 5:
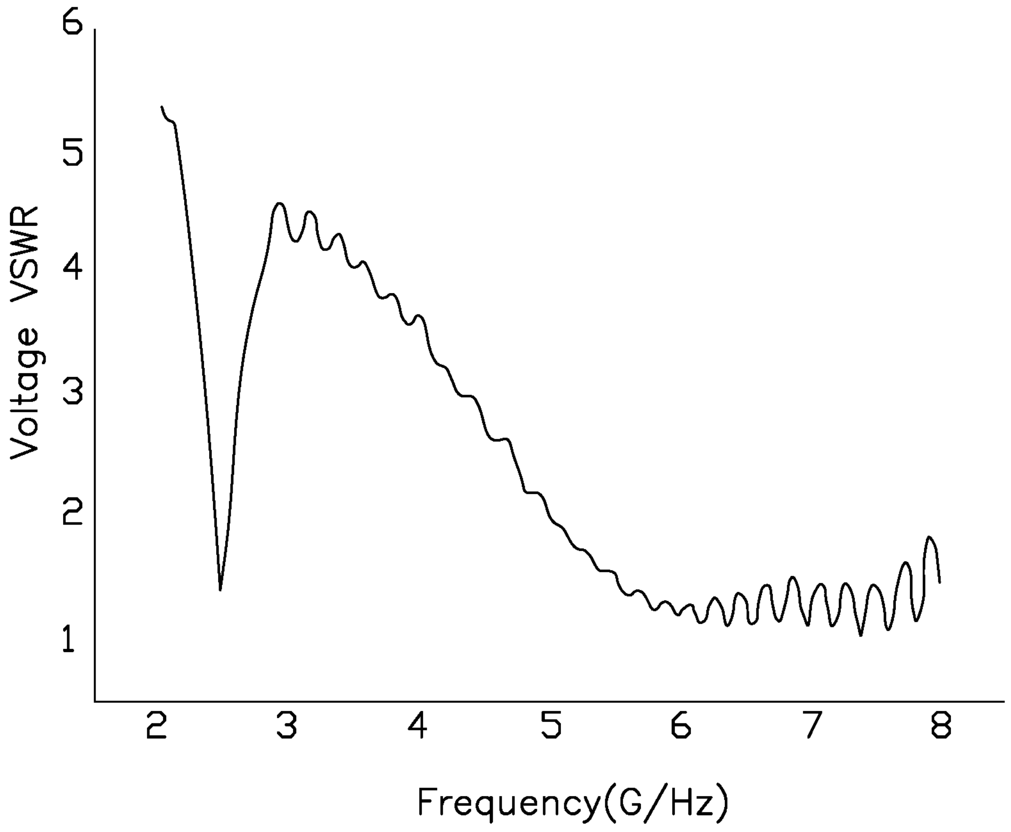
FIG. 5 is a voltage standing wave ratio diagram illustrating the antenna according to an embodiment of the present application.

FIG. 5 is a voltage standing wave ratio diagram of one embodiment of the antenna 100 according to the present application. In 2.4~2.5 GHz, 5.15~5.85 GHz, 6.1~6.8 GHz and 7.1~7.25 GHz bands, the voltage standing wave of the antenna 100 is relatively low, which can meet the design requirements of antenna 100.

Figure 6:
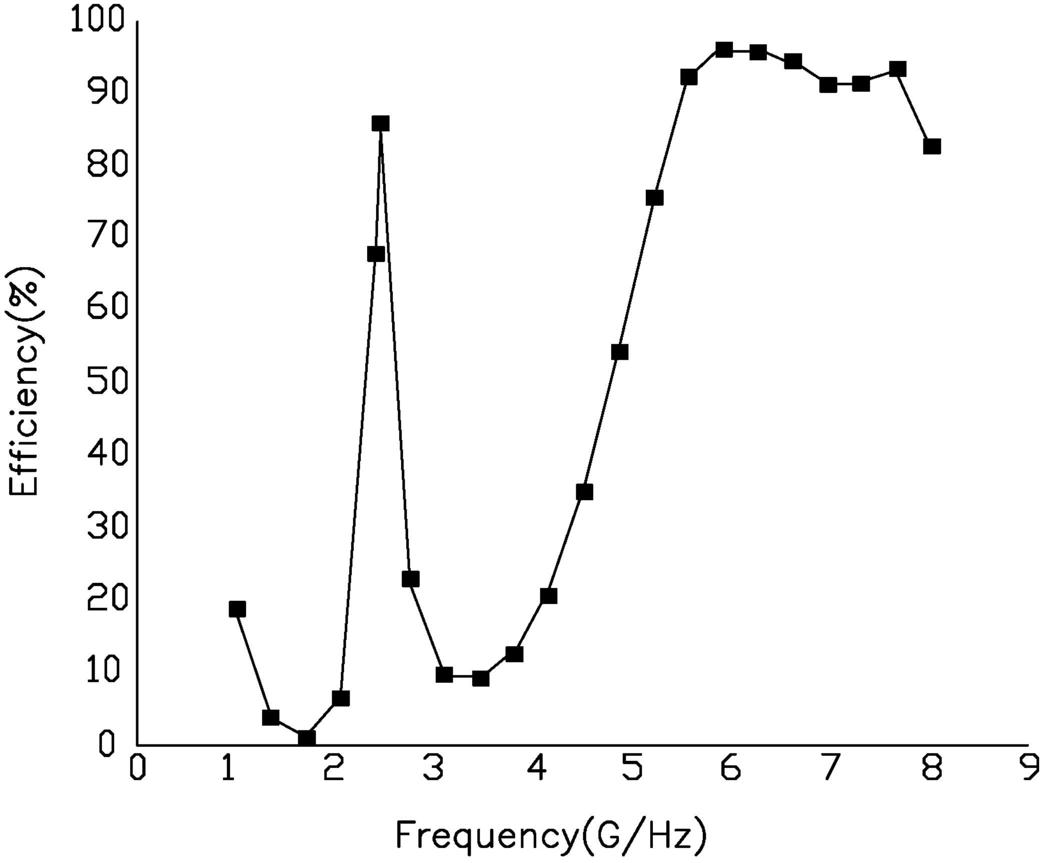
FIG. 6 is a radiation efficiency curve diagram illustrating the antenna according to an embodiment of the present application.

FIG. 6 is a radiation efficiency curve diagram of one embodiment of the antenna 100 according to the present application. In 2.4~2.5 GHz, 5.15~5.85 GHz, 6.1~6.8 GHz, and 7.1~7.25 GHz bands, the radiation efficiency of antenna 100 can reach 88%-95%, with better radiation efficiency, which can meet the design requirements of antenna 100.

FIG. 7 is a diagram of one embodiment of a vehicle 10 according to the present application. The antenna 100 can be set in the vehicle 10 to improve communication performance of the vehicle 10.

The exemplary embodiments shown and described above are only examples. Many such details are neither shown nor described. Even though numerous characteristics and advantages of the present technology have been set fourth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An antenna comprising a first radiation part, a second radiation part, a feed part, and a ground part, wherein the first radiation part comprises a first radiator, the second radiation part comprises a second radiator, the first radiator connects to a first side of the feed part and protrudes upwardly from the first side of the feed part, the second radiator connects to a second side of the feed part and protrudes upward from the second side of the feed part, the first side of the feed part is arranged relative to the second side of the feed part, wherein a height difference between the first radiator and the second radiator in a first direction is set within a preset range, and by setting the height difference between the first radiator and the second radiator in the first direction with preset range, a radiation interference between the first radiator and the second radiator is reduced, thus improving the radiation efficiency of the antenna, the first direction is perpendicular to a plane where the feed part is located, and the ground part is arranged vertically on a side of the first radiator, wherein a preset interval exists between the ground part and the feed part in a second direction that is perpendicular to the first direction, and an input impedance matching of the antenna is adjusted by adjusting the preset interval between the ground part and the feed part, and the ground part comprises an open slot.

2. The antenna of claim 1, wherein the first radiator is arranged at an angle of 90° with the feed part.

3. The antenna of claim 2, wherein the second radiator is arranged at an angle of 90° with the feed part.

4. The antenna of claim 3, wherein the first radiation part further comprises a third radiator, the first radiator bends and extends in a direction away from the feed part to form the third radiator.

5. The antenna of claim 4, wherein the second radiation part further comprises a fourth radiator, the second radiator bends and extends in a direction away from the feed part to form the fourth radiator.

6. The antenna of claim 5, wherein the third radiator is arranged at an angle of 90° with the first radiator.

7. The antenna of claim 6, wherein the fourth radiator is arranged at an angle of 90° with the second radiator.

8. The antenna of claim 7, wherein the third radiator has a shape of a rectangle, the first radiator is arranged on a width side of the rectangle, the ground part is arranged close to the feed part and on a one-third length of a length side of the rectangle.

9. The antenna of claim 8, wherein a height of the first radiator in the first direction is higher than a height of the second radiator in the first direction.

10. The antenna of claim 8, wherein the open slot is arranged on a side of the ground part close to the feed part.

11. A vehicle, comprising an antenna, wherein the antenna comprises a first radiation part, a second radiation part, a feed part, and a ground part, the first radiation part comprises a first radiator, the second radiation part comprises a second radiator, the first radiator connects to a first side of the feed part and protrudes upwardly from the first side of the feed part, the second radiator connects to a second side of the feed part and protrudes upward from the second side, the first side of the feed part is arranged relative to the second side of the feed part, wherein a height difference between the first radiator and the second radiator in a first direction is set within a preset range, and by setting the height difference between the first radiator and the second radiator in the first direction with preset range, a radiation interference between the first radiator and the second radiator is reduced, thus improving the radiation efficiency of the antenna, the first direction is perpendicular to a plane where the feed part is located, and the ground part is arranged vertically on a side of the first radiator, wherein a preset interval exists between the ground part and the feed part in a second direction that is perpendicular to the first direction, and an input impedance matching of the antenna is adjusted by adjusting the preset interval between the ground part and the feed part, and the ground part comprises an open slot.

12. The vehicle of claim 11, wherein the first radiator is arranged at an angle of 90° with the feed part.

13. The vehicle of claim 12, wherein the second radiator is arranged at an angle of 90° with the feed part.

14. The vehicle of claim 13, wherein the first radiation part further comprises a third radiator, the first radiator bends and extends in a direction away from the feed part to form the third radiator.

15. The vehicle of claim 14, wherein the second radiation part further comprises a fourth radiator, the second radiator bends and extends in a direction away from the feed part to form the fourth radiator.

16. The vehicle of claim 15, wherein the third radiator is arranged at an angle of 90° with the first radiator.

17. The vehicle of claim 16, wherein the fourth radiator is arranged at an angle of 90° with the second radiator.

18. The vehicle of claim 17, wherein the third radiator has a shape of a rectangle, the first radiator is arranged on a width side of the rectangle, the ground part is arranged close to the feed part and on a one-third length of a length side of the rectangle.

19. The vehicle of claim 18, wherein a height of the first radiator in the first direction is higher than a height of the second radiator in the first direction.

20. The vehicle of claim 18, wherein the open slot is arranged on a side of the ground part close to the feed part.

* * * * *